United States Patent
Brodsky et al.

(10) Patent No.: US 7,620,207 B2
(45) Date of Patent: Nov. 17, 2009

(54) LINKING TRACKED OBJECTS THAT UNDERGO TEMPORARY OCCLUSION

(75) Inventors: Tomas Brodsky, Croton on Hudson, NY (US); Yun-Ting Lin, Ossining, NY (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 12/017,382

(22) Filed: Jan. 22, 2008

(65) Prior Publication Data

US 2008/0226127 A1 Sep. 18, 2008

Related U.S. Application Data

(63) Continuation of application No. 10/638,021, filed on Aug. 8, 2003, now Pat. No. 7,394,916.

(60) Provisional application No. 60/446,575, filed on Feb. 10, 2003.

(51) Int. Cl.
*G06K 9/00* (2006.01)
*G06K 9/62* (2006.01)

(52) U.S. Cl. ...................... 382/103; 382/159
(58) Field of Classification Search ............... 382/103; 348/135, 142, 143, 152–155, 159, 169
See application file for complete search history.

(56) References Cited

U.S. PATENT DOCUMENTS

| | | | |
|---|---|---|---|
| 5,280,530 A | 1/1994 | Trew et al. | |
| 6,263,088 B1 | 7/2001 | Crabtree et al. | |
| 6,359,647 B1 | 3/2002 | Segupta et al. | |
| 6,542,621 B1 | 4/2003 | Brill et al. | |
| 6,674,877 B1 | 1/2004 | Jojic et al. | |
| 7,242,423 B2 | 7/2007 | Lin et al. | |
| 7,394,916 B2 | 7/2008 | Brodsky et al. | |
| 2004/0130620 A1 | 7/2004 | Buehler | |
| 2004/0252194 A1 | 12/2004 | Lin | |
| 2005/0058321 A1 | 3/2005 | Buehler | |
| 2005/0265582 A1 | 12/2005 | Buehler et al. | |
| 2008/0226127 A1 | 9/2008 | Brodsky et al. | |

OTHER PUBLICATIONS

Huang, T. and Russell, S. "Object Identification in a Bayesian Context." In Proceedings of IJAI-97, 1997.*

R. Collins, A. Lipton, H. Fujiyoshi, and T. Kanade, "Algorithms for cooperative multisensor surveillance," Proceedings of the IEEE, vol. 89, No. 10, pp. 1456-1477, 2001.*

(Continued)

*Primary Examiner*—Brian Q Le
(74) *Attorney, Agent, or Firm*—Husch Blackwell Sanders Welsh & Katz

(57) ABSTRACT

A method and system is configured to characterize regions of an environment by the likelihoods of transition of a target from each region to another. The likelihoods of transition between regions is preferably used in combination with conventional object-tracking algorithms to determine the likelihood that a newly-appearing object in a scene corresponds to a recently-disappeared target. The likelihoods of transition may be predefined based on the particular environment, or may be determined based on prior appearances and disappearances in the environment, or a combination of both. The likelihoods of transition may also vary as a function of the time of day, day of the week, and other factors that may affect the likelihoods of transitions between regions in the particular surveillance environment.

17 Claims, 2 Drawing Sheets

OTHER PUBLICATIONS

Collins, Lipton, Fujiyoshi and Kanade, "Algorithms for Cooperative Multisensor Surveillance", Invited Paper, Oct. 2001, pp. 1456-1477, vol. 89, No. 10, IEEE.

Huang, Russell, "Object Indentification in a Bayesian Context," Computer Science Division, University of California, Berkeley, pp. 1276-1282, Probabilistic Reasoning.

* cited by examiner

LINKING TRACKED OBJECTS THAT UNDERGO TEMPORARY OCCLUSION

This application is a continuation of U.S. patent application Ser. No. 10/638,021, filed 8 Aug. 2003, now U.S. Pat. No. 7,394,916 and claims the benefit of U.S. Provisional Patent Application 60/446,575, filed 10 Feb. 2003.

BACKGROUND OF THE INVENTION

1. Field of the Invention

This invention relates to the field of video surveillance, and in particular to a system and method for tracking objects that are occluded while traversing a surveillance scene, or occluded as the object traverses from one scene to another.

2. Description of Related Art

Video surveillance systems often include object-tracking capabilities, wherein an identified object, or target, is continually identified as the object travels within a scene, or set of scenes. Generally, multiple objects are simultaneously tracked. The objects may include people, vehicles, parcels, and so on.

In a typical surveillance system, one or more cameras are strategically placed to optimize the video coverage provided. As an object traverses a camera's field of view, an object-tracking module searches each sequential image frame for the target, based on the appearance of the target within a prior image frame. The appearance of the target in each sequential frame will not generally be identical to its appearance in the prior frame, due to changes in the object's posture and orientation as it moves, or due to changes in lighting conditions, camera angle, as the object enters different areas, and so on. Generally, the amount of change from frame to frame is limited, and the identification of a similar, albeit not identical, object in each sequential frame is fairly straightforward.

Object-tracking becomes more difficult if an object disappears from a scene, then reappears at a different location in the scene, or in a different scene. Such a disappearance-then-reappearance, herein termed a temporary occlusion, can occur, for example, as the target passes behind an obstacle, such as a pillar or tree, as the target exits through a door from one surveillance scene to another, as the target enters then exits a non-surveyed area, such as a rest-room or closet, and so on. The difficulty arises from the fact that the target's reappearance differs in time and/or space from when and/or where it disappeared. The lighting conditions may differ on each side of an obstacle, the object may change appearance while behind the obstacle, the camera angle may differ on each side of a door, a different object may appear at the other side of the obstacle, or in the other scene, while the target is still occluded, and so on. The difficulty is further compounded because some objects may disappear and not re-appear in a scene, for example when a target leaves the surveyed area, or areas, entirely.

Conventional systems generally predict the appearance and location of a target in each successive image frame, and typically extend the concept to predict the appearance and location of an occluded target in future frames, based on the prior trajectory of the target before its disappearance. U.S. Pat. No. 5,280,530, "METHOD AND APPARATUS FOR TRACKING A MOVING OBJECT", issued 18 Jan. 1994 to Trew et al., and U.S. Pat. No. 6,263,088, "SYSTEM AND METHOD FOR TRACKING MOVEMENT OF OBJECTS IN A SCENE", issued 17 Jul. 2001 to Crabtree et al., are examples of such techniques, and are incorporated by reference herein.

In "BAYESIAN MULTI-CAMERA SURVEILLANCE", Proceedings of Computer Vision and Pattern Recognition, 1999 II:253-259, V. Kettnaker and R. Zabih describe an object-tracking system wherein a "chain of appearances" is created for a tracked object as the object traverses the fields of view of multiple cameras. In addition to using the visual data, the system uses a stochastic model that mathematically expressed how likely it was that an object last seen in one camera would be observed next in a different camera at a particular time. To facilitate the tracking of multiple objects, the image information from all of the cameras is stored in a common database, and various possible object paths are postulated. Using a Bayesian model, the optimal solution is the set of object paths with the highest posterior probability, given the observed data. The maximum a posteriori solution is approximated using linear programming techniques.

BRIEF SUMMARY OF THE INVENTION

It is an object of this invention to provide a method and system that facilitates the tracking of targets that are temporarily occluded in a surveillance scene. It is a further object of this invention to provide a method and system that is configured to enhance the tracking of a target in an environment, based on prior events in the environment. It is a further object of this invention to provide a method and system that enhances the performance of existing object-tracking systems, based on a characterization of the environment.

These objects and others are achieved by a method and system that is configured to characterize regions of an environment by the likelihood of transition of a target from one region to another. The likelihood of transition is preferably used in combination with conventional object-tracking algorithms to determine the likelihood that a newly-appearing object in a scene corresponds to a recently-disappeared target. The likelihoods of transition may be predefined based on the particular environment, or may be determined based on prior appearances and disappearances in the environment, or a combination of both. The likelihoods of transition may also vary as a function of the time of day, day of the week, and other factors that may affect the likelihood of transitions between regions in the particular surveillance environment.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE INVENTION

Figure 1:
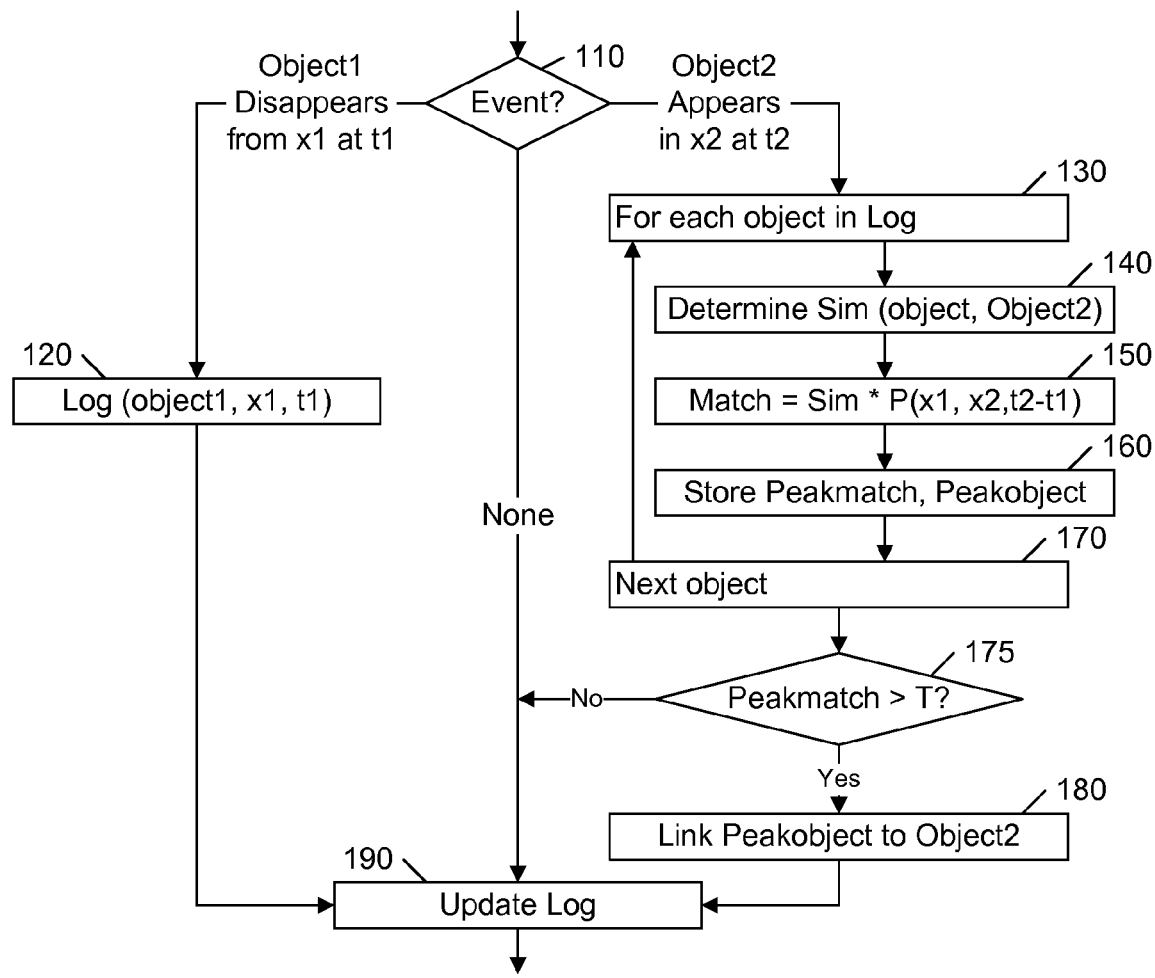
FIG. 1 illustrates an example flow diagram of an occluded-object-linking process for an object tracking system in accordance with this invention.

FIG. 1 illustrates an example flow diagram of an occluded-object-linking process for an object tracking system in accordance with this invention. An event detector 110 detects whether an existing object, object 1, has disappeared from a region, x1, of a scene, or a new object, object 2, has appeared in a region x2 of a scene. The postscripts 1 and 2 are used for ease of reference; one of ordinary skill in the art will recognize in view of this disclosure that there could be more than two regions of a scene, that objects could disappear or appear at the same scene, that more than two objects can be detected, and so on.

If object1 disappears from a region x1, the event is logged, at 120; optionally, the time of disappearance, t1, is also logged. Other items that may facilitate recognition of object1 if it should appear again in this region or another region, such as the direction and speed of the object prior to its disappearance, may also be logged.

If object2 appears in a region x2, all of the objects currently contained in the log of disappearances are checked, to determine whether object2 corresponds to one of these objects, via the loop 130-170. At 140, the similarity between object2 and the currently selected object in the log is determined, or estimated, using conventional pattern matching or object matching techniques. Generally, such techniques include a combination of color and/or tone comparisons, size and/or shape comparisons, and so on; in special-purpose applications, the techniques may also include recognition of facial features, characteristic postures, speed of motion, and so on.

In accordance with this invention, the determination of whether a newly appearing object2 corresponds to an object that previously disappeared is also dependent upon the likelihood of the object transitioning from its region of disappearance x1 to the region of appearance x2 of object2, hereinafter termed $Pt(x1,x2)$. Optionally, the likelihood that the appearance corresponds to a prior disappearance is also dependent upon the time duration between the disappearance and subsequent appearance, hereinafter termed $Pt(x1, x2, t2-t1)$. One of ordinary skill in the art will recognize that the likelihood of reappearance may be defined with other parameters, as well, such as the speed of the object when it appeared or disappeared, and so on. One of ordinary skill in the art will also recognize that this likelihood may be expressed in a variety of forms, the most common of which include mathematical expressions of probabilities and statistics, although less formal expressions, such as heuristic weighting factors and others may also be used.

At 150, the determined similarity Sim between object2 and the current object is combined with the likelihood of transition of an object from x1 to x2 within time duration t2–t1, $Pt(x1, x2, t2-t1)$ to determine an overall likelihood of object2 matching the current object. In the example embodiment, the similarity Sim and likelihood Pt are combined via a multiplication, although other methods of combining the two measures could be used. If, at 160, this overall likelihood of a match between object2 and the current object is higher than the likelihood of a match between object2 and previous objects in the log, or if the current object is the first object in the log, this likelihood is stored as the current peak measure, Peakmatch, with a reference to this current object, Peakobject. If this overall likelihood of a match between object2 and the current object is less than the thus-far determined peak measure, the prior Peakmatch and Peakobject are retained.

After the loop 130-170 has processed all of the objects in the log, the Peakmatch value will be the highest determined likelihood of a match between object2 and each of the objects. If, at 175, this Peakmatch value is above a given threshold amount, T, then the Peakobject in the log corresponding to the measured Peakmatch is determined to be the same object as object2, and these objects are linked, or bound together, at 180. In this manner, the same object can be tracked despite temporary disappearances, or occlusions. This binding typically includes associating any prior attributes of the Peakobject, such as a tracking of the object's path in previous regions, are also linked to the newly appearing object2.

At 190, the log is updated. If a previously-disappeared object in the log is found to correspond to the newly appearing object, and is linked to the newly appearing object, at 180, the updating of the log includes a removal of the previously-disappeared object from the log. In like manner, if sufficient time has elapsed since the time of disappearance t1 of a previously-disappeared object so as to render the likelihood of this object having transitioned to any region negligible, the object is removed from the log, to avoid further comparisons. Although a time-based management of the log is preferred, in an alternative embodiment, the log may be of a fixed size, and configured to retain all prior disappearances until space is needed in the log to store a new disappearance, using a first-in-first-out (FIFO) replacement strategy.

One of ordinary skill in the art will recognize that the details of the example flow diagram of FIG. 1 can be changed while still embodying the principles of this invention. For example, the order of flow 140-160 can be changed, so that the likelihood of transition $Pt(x1, x2)$ can be used to avoid the determination of a similarity measure, Sim, between object2 and the currently selected object. If, for example, there is no feasible egress from region R1 to region R2, $Pt(R1, R2)$ will be zero. If object2 newly appears in region R2, there is no need to determine the similarity Sim between object2 and any object in the log that disappeared from region R1.

Any of a number of methods and techniques can be used to determine or estimate the likelihood of transition between regions. Many surveillance systems include a floorplan or other representation of the physical environment in which the system is deployed. In such systems, the surveillance cameras are generally calibrated and the scenes from the cameras are processed to report the location of objects using coordinates that correspond to the physical environment. An embodiment of this invention in such a system will include defining the aforementioned regions to and from which objects appear and disappear to correspond to rooms, hallways, parking lots, etc., and defining or estimating the likelihood of transition between the regions. These predefined or estimated likelihoods may be subsequently adjusted based on actual traffic flow, as discussed below. For further resolution and improved performance, each physical area may be partitioned into a set of regions, wherein the regions corresponds to potential entry or egress locations within each physical area.

In a less complex embodiment that does not require the transformation of locations in a camera image into real-world coordinates, the regions can be defined to directly correspond to the camera image. For example, if the camera's field of view includes a pillar or other obstruction, two regions can be defined, one on each side of the pillar in the camera image; in like manner, if the scene includes a doorway, a region can be defined to encompass the doorway in the camera image. The definition of each region in such an embodiment is preferably performed using a screen cursor to define bounding rectangles on the display screen that contains the camera image; other shapes, such as polygons, and curved boundaries, may also be used. Defined regions may be named, for ease of reference, and the configuration system can be configured to automatically generate other regions to cover areas in the camera image that are not explicitly defined or named. The likelihood of an object transitioning between each of the regions can then be predefined or estimated, and optionally updated based on actual traffic flow, as discussed below.

In a very simple embodiment, the configuration system automatically partitions the camera image into a uniform set of squares or rectangles, without reference to the particular features that are present in the camera image. In such an embodiment, the likelihood of transition can be predefined, using general rules, and then modified based on actual traffic flow. The general rules might encompass the fact that in a typical surveillance camera scene, the likelihood of transition to a horizontally adjacent region is generally higher than the likelihood of transition to a diagonally adjacent region, which is higher than the likelihood of transition to a vertically adjacent region, and each of these likelihoods are substantially greater than the likelihood of a transition to a non-adjacent region. Alternatively, the likelihood of transition can be predefined to a uniform default value, then modified based on actual traffic flow.

As noted above, the transition likelihoods between regions may be predefined based on the particular physical environment, some characteristic features of a camera scene, some general rules of movements in a surveillance scene, a uniform default value, or combinations of such techniques. In a preferred embodiment of this invention, these predefined likelihoods are modified based on actual traffic flow. Different techniques are commonly available for modifying probabilities or likelihoods based on observed phenomena. If the predefined likelihoods are based on an informed analysis of the camera scene, the subsequent analysis of actual traffic flow is used to affirm these likelihoods and effect relatively minor adjustments as required. If the predefined likelihoods are based on general rules or common default values, on the other hand, the subsequent analysis of the actual traffic flow will have a significant effect on these default values. Using common terminology, the statistics based on actual traffic flow will generally be heavily low-pass filtered as they are combined with reliable likelihoods, and lightly low-pass filtered as they are combined with less reliable likelihoods.

The transition likelihoods may be based on a variety of ancillary factors that may affect traffic flow, such as the time of day, day of the week, season of the year, current weather conditions, and so on. In an office or factory environment, the traffic flow may also be based on particular business cycles, or particular business events or occurrences. In a preferred embodiment of this invention, multiple sets of transition likelihoods are maintained for the variety of possible traffic flow conditions, and the appropriate set is selected and used as required. Other techniques for maintaining multi-variate likelihoods are common in the art.

Figure 2:
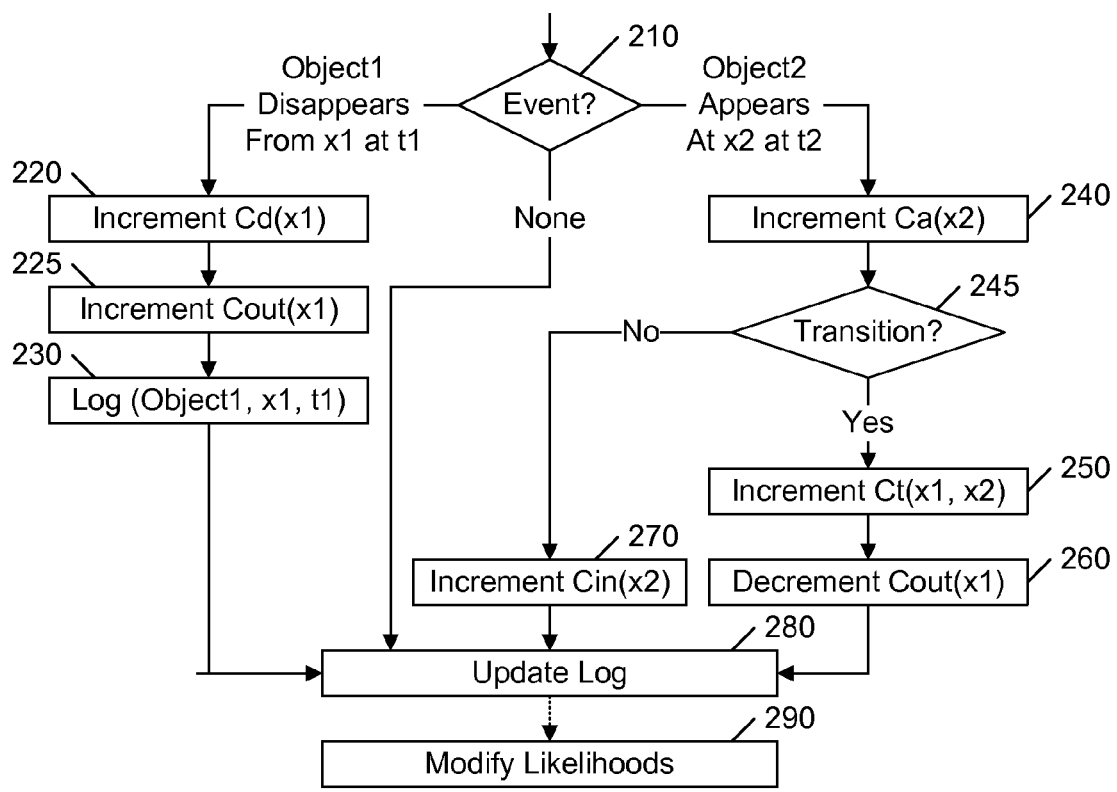
FIG. 2 illustrates an example flow diagram for determining parameters of an occluded-object-linking process in accordance with this invention.

FIG. 2 illustrates an example flow diagram for determining parameters of an occluded-object-linking process, based on actual traffic flow, in accordance with this invention. One of ordinary skill in the art will recognize that there are a variety of techniques available for estimating probabilities and likelihoods based on observed events, and the presentation of the example technique of FIG. 2 is not intended to dissuade the use of other available technique.

An event detector in the surveillance system reports object appearances and disappearances, as discussed above with regard to FIG. 1. If, at 210, an object, object1, is reported to have disappeared from a region, x1, a count of disappearances from region x1, $Cd(x1)$ is incremented, at 220. Another count, $Cout(x1)$, is also incremented, at 230. As discussed further below, these two counts distinguish between the number of disappearing objects from region x1 that subsequently reappear, $Cd(x1)$, and the number of disappearing objects from region x1 that do not reappear, $Cout(x1)$. At 230, the disappearance of object1 from region x1 is recorded in a log, optionally with the time of disappearance t1, and/or other parameters, such as the speed or direction of travel before disappearing, that facilitate the association of a subsequent reappearance of object1 to this disappearance.

If, at 210, the event detector reports an appearance of an object, object2, at a region x2, a count of arrivals at x2, $Ca(x2)$ is incremented. At 245, this appearance of object2 is compared to the log of disappearances of objects, to determine whether object2 corresponds to a previously-disappeared object, using the techniques discussed above with regard to FIG. 1, using the current likelihoods of transition, which may be the original predefined estimates of the likelihoods, or updated estimates, based on prior actual traffic flow. Optionally, the search of the log for a previously-disappeared object for a match with object2 can be based solely on conventional similarity measures, to provide a degree of independence between the determination of the transition likelihoods from prior estimates of the transition likelihoods. To further provide independence in these estimates, a manual identification of previously-disappeared objects corresponding to newly-appearing objects can be performed during this process of determining the likelihood parameters based on actual traffic flow.

If, at 245, the appearance of object2 corresponds to a previously-disappeared object from region x1, a count of the number of detected transitions from region x1 to region x2, $Ct(x1,x2)$ is incremented, at 250. Optionally, the time duration between the time of disappearance t1 and the time of appearance t2, can also be recorded, to facilitate the determination of a time-dependent transition likelihood. As noted above, other parameters that may facilitate the determination of correspondence between a previously-disappeared object and a newly appearing object, such as the speed or direction of disappearance and arrival, may also be recorded for this transition. At 260, the aforementioned count $Cout(x1)$ is decremented. In this manner, the count $Cout(x1)$ corresponds to the number of objects that disappear from x1 and do not reappear, whereas the count $Cd(x1)$ corresponds to the total number of objects that disappear from region x1.

If, at 245, the appearance of object2 in region x2 does not correspond to a previously-disappeared object, a count $Cin(x2)$ is incremented, corresponding to a count of the number of new objects that appear in region x2.

At 280, the log of disappearances is updated. Previously-disappeared objects that correspond to newly appearing objects are removed from the log, and disappearances that occurred at a time that is beyond a 'staleness' threshold are removed as being unlikely to ever reappear.

At 290, the transition likelihoods are updated. The dashed arrow between 280 and 290 is intended to indicate that the probabilities may be updated continuously, or after a defined traffic-analysis time period, or after a given number of events, and so on. The updating of the likelihoods is based on the count of transitions between regions relative to the number of appearances and disappearances at the regions. For example, if a region has a single egress, and that egress leads to a single other region, the number of transitions from the first to second region will equal the number of disappearances from the first region, and the likelihood of future transitions from the first region to the second region will be very high whenever an object disappears from the first region. Conversely, if the number of permanent disappearances, Cout, from a region equals the number of total disappearances, Cd, the likelihood of future transitions from this region to other regions will be very low whenever an object disappears from the region. In like manner, if there is a single entry into region x2, from x1, the number of new appearances in x2, $Ca(x2)$ will equal the number of transitions from x1 to x2, $Ct(x1, x2)$, and the likelihood of futures transitions of objects from region x1 to x2, given an appearance of a new object within x2, is very high. Methods of determining likelihoods of future events, based on prior occurrences of similar events, are common in the art.

Determining the likelihoods of transition is further enhanced in a preferred embodiment by the use of likelihoods that are time-dependent. In a straightforward embodiment, the likelihood that an appearance corresponds to a prior disappearance is set to zero, or near zero, after a given amount of time from the time of the latest disappearance (hereinafter a "time-out" period); the time-out period being determined based on the particular environment. In a multi-storied building, for example, with security cameras on multiple floors, the time-out period for a camera with a view of an elevator is typically based on a maximum estimated time for a person to transit between floors. In like manner, the likelihood may be set to zero during a minimum estimated time. In a more complex embodiment, the probability may vary continuously with time, peaking at the most likely duration after a disappearance and tapering off as the duration extends, using, for example, an assumed exponential distribution of appearance time after disappearance with a mean that equals the average observed times between appearances and disappearances.

As noted above, the degree to which observed transitions, disappearances and appearances affect the likelihood estimates is based on the inherent reliabilities associated with the existing likelihood estimates. If the existing likelihood estimates lack a firm foundation, the likelihoods based on the observed events could be used to replace the existing likelihoods. If, on the other hand, the existing likelihoods are based on an analysis of the surveillance area with respect to possible entry and exit points, or are based on extended periods of prior observations, the likelihoods based on the currently observed events may form a lightly weighted term in a weighted running-average computation, or low-pass filter. Optionally, a 'confidence factor', common in the field of statistical estimation, can be associated with each of the likelihoods, and the effects of additional observations on the existing estimates can be based on the confidence factor that is associated with the estimate. For example, if a likelihood of transition between a first region and second region is based on "n" prior observed disappearances from the first region, the result of a next observed transition can be weighted by a factor of 1/(n+1) before it is combined with the existing likelihood:

$$L=(n*L+r)/(n+1), \qquad (1)$$

where L is the likelihood estimate, and r is the result (0=non-transition, 1=transition) of the currently observed disappearance. In this manner, if the existing likelihood estimate is based on a large number of prior disappearances, the effect (transition or non-transition) of a subsequent disappearance has only a slight effect of the likelihood estimate. On the other hand, if the existing likelihood estimate is based on only a few prior observed disappearances, the effect of a subsequent disappearance will have a substantial effect on the newly determined likelihood estimate. In a general case, to include the original default likelihood estimate:

$$L=(m*D+n*L+r)/(m+n+1), \qquad (2)$$

where D is the original default likelihood estimate and m is a confidence factor associated with this default estimate. If the original estimate lacks a firm foundation, m is set to a small integer value; if the original estimate is based on an extensive analysis, m is set to a very high integer value. One of ordinary skill in the art will recognize that the above equations are provided to illustrate the general form of a weighted running average, and other techniques for including new observations into a likelihood estimate are common in the art.

Note that the example flow diagram of FIG. 1 is provided for ease of understanding the principles of this invention. One of ordinary skill in the art will recognize that efficiencies can be gained by departing from the example peak-detecting probability analysis depicted in FIG. 1. For example, the transition likelihood Pt(x1, x2) measure need not be a conventional Bayesian conditional probability measure, because additional information is generally available, particularly in a time-limited analysis. For example, if region x2 only has a limited number of regions from which an appearance may occur, and if only one of these regions, x1, exhibits a contemporaneous disappearance, then the likelihood of a correspondence between an appearance in x2 corresponding to this sole disappearance from x1 is high, regardless of the (long-term) conditional likelihood of transitions from region x1 to x2 given a disappearance from x1.

In like manner, to avoid choosing the wrong object to link to a newly appearing object when the likelihood of two or more recently-disappeared objects matching are approximately the same, a ratio of likelihoods may be used to determine that a particular object is more strongly matched to the appearing object than others. If the region has a non-zero likelihood of a new object appearing in the region, i.e. an object that did not transition from another region, the likelihood of the newly-appearing object being such an object is also used to affect the criteria used for determining whether a particular recently-disappeared object matches the newly-appearing object.

The selection process of determining whether a particular object should be linked to a newly-appearing object may be an ongoing process, wherein additional information is gathered from each subsequent frame to more clearly indicate the similarities or differences among objects, or to eliminate candidate objects that are determined to be linked to other newly-appearing objects. The ongoing matching process continues until the likelihood of a match clearly indicates that the objects should be linked, or clearly indicates that the objects should not be linked, or until a specified time duration elapses without a match.

One of ordinary skill in the art will also recognize that the literature is replete with techniques for estimating probabilities and other statistics, as well as a variety of techniques that will facilitate a determination of the likelihood that a previously-disappeared object corresponds to a newly-appearing object, in view of this disclosure. For example, a variety of paradigms and models, such as neural networks and queuing-theory models, can be used to model the traffic flow through the regions of the scenes in the surveillance system, and the variety of tools that are commonly available to facilitate the processing of such paradigms and models can be applied to this invention as well.

Figure 3:
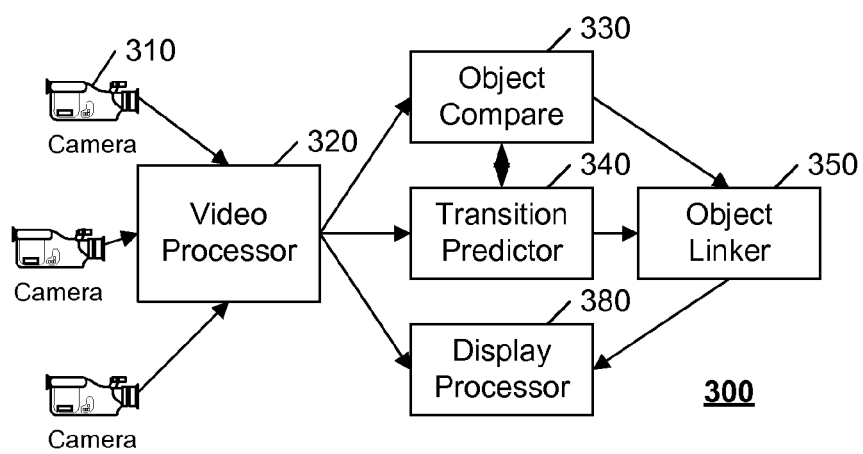
FIG. 3 illustrates an example block diagram of a security system in accordance with this invention.

FIG. 3 illustrates an example block diagram of a security system 300 in accordance with this invention. The system 300 includes one or more cameras 310 or other detection devices that provide information from which disappearance, appearance, and transition events can be deduced. A processor 320 processes the information provided by the one or more cameras 310 or other detection devices to provide information suitable for object tracking. The processor 320 may, for example, process a camera image to segregate the image into areas of similar color; or, the processor may process the camera image to define edges or other defining characteristics within the image; or, the processor may merely provide a copy of the camera image in a common format, such as RGB (red-green-blue), HIS (hue, intensity, saturation), or YUV (luminance and chrominance), for subsequent processing by the object-tracking modules.

In a preferred embodiment of this invention, the processor 320 identifies objects within regions of an image. As discussed above, the regions within an image may correspond to "real-world" regions in the physical environment that is within the field of view of the cameras 310, or the regions may correspond to custom-defined regions within the scene provided by each camera 310, or the regions may correspond to uniform blocks within each scene provided by the cameras 310, or any combination thereof. Objects are identified using techniques common in the art. For example, "background subtraction" is commonly used to eliminate the details of the static background, so that only differences from the background are identified as potential objects of interest. Generally, an object is defined as a collection of groups of pixels that appear to move as an entity. Thereafter, person-objects are defined as objects that are within a given minimum height and maximum width, to distinguish person-sized-objects from non-person-sized objects. Other distinguishing characteristics are commonly used to identify person-objects, such as the presence of limbs and a head, and so on. In like manner, vehicle-objects can be defined as having particular characteristics that distinguish vehicles from non-vehicles.

An object comparer 330 is configured to compare objects based on the information provided by the processor 320 at different times, using techniques common in the art to determine similarity. The result of the comparison is provided to an object linker 350 that is configured to associate, or bind, objects in temporally different images as being the same object. As an object traverses across a camera's field of view, for example, the linker 350 effects the association of the object's particular collection of pixels in each sequential camera frame as being a representation of the same object, based on the similarity measure provided by the comparer 330. Techniques for comparing and linking object representations to track an object within and between scenes are common in the art. These conventional techniques allow for temporary occlusion of an object, wherein the linker 350 associates/links a newly-appearing object in a camera scene to an object that disappeared from the camera scene in the recent past, such as when the object passes behind a structure or other item that obscures the camera's view of the object while the object traverses the distance of the obstruction. These convention techniques also include techniques for associating a newly-appearing object in one camera's field of view to be associated with a recently-disappeared object from another camera's field of view, using conventional similarity-determination techniques.

In accordance with this invention, a transition predictor 340 augments the object-tracking function of the comparer 330 and linker 350, by providing a measure of the likelihood of a newly-appearing object in a region, x2, corresponding to a previously-disappeared object from this or another region, x1. If it is likely that a previously-disappeared object from region x1 will reappear as a newly-appearing object in region x2, then the significance of the similarity measure produced by the comparer 330 is enhanced. If it is unlikely that a previously-disappeared object from region x1 will reappear as a newly-appearing object in region x2, then the significance of the similarity measure produced by the comparer 330 is attenuated. The linker 350 determines whether a newly-appearing object in region x2 corresponds to a previously-disappeared object in region x1 based on both the similarity measure provided by the comparer 330 as well as the likelihood measure provided by the transition predictor 340.

A display processor 360 is provided to display the images from the cameras 310 or other detection devices, as well as the result of the object-tracking function produced by the comparer 330, predictor 340, and linker 350. In a straightforward embodiment of this invention, the path of the object is overlaid upon the current image containing the object. When an object disappears, the path terminates at the point of disappearance of the object; when a transition is detected, the path is extended to the point of re-appearance of the object, and subsequent follows the continued progression of the object. One of ordinary skill in the art will recognize that other techniques may be used to display the results of an object-tracking process. In another example embodiment, the likelihood estimate could be used to affect the display of the path associated with the object. For example, a thick line could be used to initially mark the path of an object that is tracked from frame-to-frame in a scene. When an occlusion occurs, and the linker associates a newly-appearing object as the prior-disappeared object, the width of the path line could be decreased, based on the confidence associated with the linking of these two objects as being the same object. This confidence will be a function of a combination of the similarity measure produced by the comparer 330 and the transition likelihood measure provided by the transition predictor 340.

As illustrated and detailed above, this invention provides an effective and efficient technique for augmenting the processes used to associate reappearances of objects after temporary occlusion. One of ordinary skill in the art will recognize that the principles of this invention can be applied to new or existing surveillance systems, and does not preclude the use of any of the variety of object-comparison techniques that are commonly used to deal with temporary occlusion, and is not expected to preclude the use of future object-comparison techniques. U.S. Pat. No. 7,242,423, "LINKING ZONES FOR OBJECT TRACKING AND CAMERA HANDOFF", issued 10 Jul. 2007 to Yun-Ting Lin, discloses a system for tracking objects in a multi-camera environment based on a definition of zones within each camera's field of view from and to which an object may traverse to one or more other camera's fields of view, and is incorporated by reference herein.

The foregoing merely illustrates the principles of the invention. It will thus be appreciated that those skilled in the art will be able to devise various arrangements which, although not explicitly described or shown herein, embody the principles of the invention and are thus within its spirit and scope. For example, in systems that characterize objects by 'type', such as 'person', 'vehicle', 'package', and so on, multiple logs of disappearances may be maintained, for each type, or grouping of types, and/or multiple sets of transition likelihoods may be maintained. Certain egresses may accommodate, for example, a transition of a person or package, but not a vehicle. These and other system configuration and optimization features will be evident to one of ordinary skill in the art in view of this disclosure, and are included within the scope of the following claims.

In interpreting these claims, it should be understood that:

a) the word "comprising" does not exclude the presence of other elements or acts than those listed in a given claim;

b) the word "a" or "an" preceding an element does not exclude the presence of a plurality of such elements;

c) any reference signs in the claims do not limit their scope;

d) several "means" may be represented by the same item or hardware or software implemented structure or function;

e) each of the disclosed elements may be comprised of hardware portions (e.g., including discrete and integrated electronic circuitry), software portions (e.g., computer programming), and any combination thereof, f) hardware portions may be comprised of one or both of analog and digital portions;

g) any of the disclosed devices or portions thereof may be combined together or separated into further portions unless specifically stated otherwise;

h) no specific sequence of acts is intended to be required unless specifically indicated; and i) the term "plurality of" an element includes two or more of the claimed element, and does not imply any particular range of number of elements; that is, a plurality of elements can be as few as two elements, and can include an immeasurable number of elements.

We claim:

1. A method comprising:
a video display processor displaying a first image corresponding to a field of view of at least one camera,
providing a user interface that allows a user to:
identify a first region of the first image at which objects may disappear from the image,
identify a second region of a second image at which objects may appear in the other image, and
define a first likelihood that an object that disappears from the first region will appear in the second region, and
an object linker subsequently identifying a target object in the first image, and determining whether the target object appears in the second image based on the first likelihood and an object similarity measure.

2. The method of claim 1, wherein the first region of the first image corresponds to a doorway.

3. The method of claim 1, wherein the first image corresponds to section of a floorplan, and the second image corresponds to an other section of the floorplan.

4. The method of claim 1, wherein the likelihood is defined as a function of at least one of:
a time of day,
a day of a week, and
a season of a year.

5. The method of claim 1, including updating the likelihood based on occurrences of objects disappearing from the first region and appearing in the second region.

6. The method of claim 1, including:
allowing the user to:
identify a third region in the first image at which objects may appear in the first image, and
define a second likelihood that the object that disappears from the first region will appear in the third region, and
determining whether the target object reappears in the first image based on the second likelihood and an other object similarity measure.

7. The method of claim 1, including allowing the user to define a second likelihood that an object that disappears from the second region will appear in the first region.

8. The method of claim 1, wherein defining the first likelihood includes accepting a default likelihood as the first likelihood.

9. The method of claim 1, wherein identifying the first region includes using a screen cursor to define a bounding rectangle.

10. The method of claim 1, including modifying the first likelihood based on occurrences of transitions between the first region and the second region, wherein the modifying includes applying a low-pass filter to combine a frequency of the occurrences to the first likelihood.

11. The method of claim 1, including allowing the user to:assign a first name to the first region and a second name to the second region, and define the first likelihood via a reference to the first and second names.

12. A system comprising:
a display processor that is configured to display a first image corresponding to a field of view of at least one camera,
a user interface that is configured to allow a user to:
identify a first region of the first image at which objects may disappear from the image,
identify a second region of a second image at which objects may appear in the other image, and
define a first likelihood that an object that disappears from the first region will appear in the second region, and
an object comparer that is configured to:
compare a target object in the first image to an other object in the second image to provide an object similarity measure, and
determine whether the other object in the second image corresponds to the target object, based on the first likelihood and the object similarity measure.

13. The system of claim 12, wherein the first region of the first image corresponds to a doorway.

14. The system of claim 12, wherein the first image corresponds to section of a floorplan, and the second image corresponds to an other section of the floorplan.

15. The system of claim 12, wherein:
the user interface is configured to allow the user to:
identify a third region in the first image at which objects may appear in the first image, and
define a second likelihood that the object that disappears from the first region will appear in the third region, and
the object comparer is configured to determine whether the target object reappears in the first image based on the second likelihood and an other object similarity measure.

16. The system of claim 12, wherein the user interface is configured to allow the user to identify the first region by using a screen cursor to define a bounding rectangle.

17. The system of claim 1, including a transition predictor that includes a low-pass filter that is configured to modify the first likelihood based on occurrences of transitions between the first region and the second region.

* * * * *